United States Patent
Levine

[15] 3,676,452
[45] July 11, 1972

[54] ACENAPHTHYLOXAZOLE DERIVATIVES

[72] Inventor: Seymour D. Levine, North Brunswick, N.J.
[73] Assignee: E. R. Squibb & Sons, Inc., Princeton, N.J.
[22] Filed: Feb. 2, 1970
[21] Appl. No.: 8,016

[52] U.S. Cl. ................260/307 D, 260/340.9, 260/484 P, 260/590, 424/272
[51] Int. Cl. .........................................................C07d 85/00
[58] Field of Search ............................................260/307 D

[56] References Cited

UNITED STATES PATENTS 2,528,000  10/1950  Johnson et al. ..........................260/465

Primary Examiner—Alex Mazel
Assistant Examiner—R. V. Rush
Attorney—Lawrence S. Levinson, Merle J. Smith, Donald J. Perrella and Burton Rodney

[57] ABSTRACT

In addition, intermediates and a process for preparing the acenaphthyloxazoles are provided, which process comprises reacting an acenaphthenequinone with ethylene glycol in the presence of p-toluenesulfonic acid to form an acenaphthenequinone monoethylene ketal, reducing the ketal to the corresponding 1-hydroxy-2-acenaphthenone monoethylene ketal, hydrolyzing the ketal and reacting the resulting 1-hydroxy-2-acenaphthenone with succinic acid or acid anhydride to form the corresponding succinate and reacting the succinate with ammonium acetate and acetic acid to form the compounds of the invention.

7 Claims, No Drawings

ACENAPHTHYLOXAZOLE DERIVATIVES

The present invention relates to acenaphthyloxazole derivatives which are useful as anti-inflammatory agents and are effective in warm-blooded animals, for example, in a manner similar to indomethacin. They may be used to decrease joint swelling, tenderness, pain and stiffness in mammalian species, e.g., in conditions such as rheumatoid arthritis. A compound of formula I (below) may be compounded according to accepted pharmaceutical practice in oral dosage forms such as tablets, capsules, elixirs or powders for administration of about 100 mg. to 2 gm. per day, preferably 100 mg. to 1 gm. per day in two to four divided doses.

The acenaphthyloxazoles of the invention have the general formula:

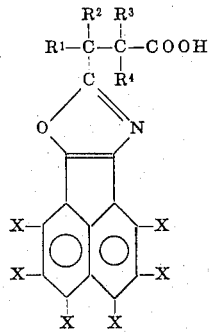

wherein the X's can be the same or different and are hydrogen, halogen, nitro, lower alkoxy having from one to about four carbon atoms, or halolower alkoxy having from one to about four carbon atoms, and $R^1$, $R^2$, $R^3$ and $R^4$ can be the same or different and are hydrogen or lower alkyl having from one to about four carbon atoms.

Examples of lower alkyl radicals included in the compounds of the invention are straight or branched chain radicals and include methyl, ethyl, propyl, isopropyl, n-butyl, and the like.

Examples of suitable alkoxy radicals are those corresponding to the foregoing alkyl radicals.

The halogen may be F, Cl, Br or I.

Alkoxy radicals substituted by F, Br, Cl or I are encompassed by the terms haloalkoxy. Trifluoromethoxy is a preferred haloalkoxy radical.

The compounds of particular interest are acenaphthyloxazoles unsubstituted in the aromatic ring or the para-substituted symmetrical derivatives thereof. Furthermore, the pair of R radicals on the alpha carbon atom of the acid substituent should correspond to the pair of R radicals on the beta carbon atom.

Exemplary of acenaphthyloxazoles falling within the present invention include, but are not limited to, the following:

(1)

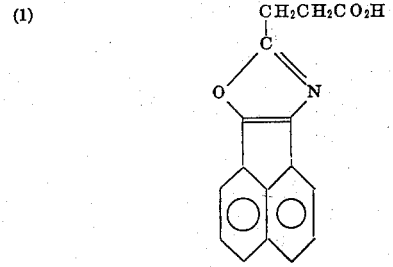

(2)

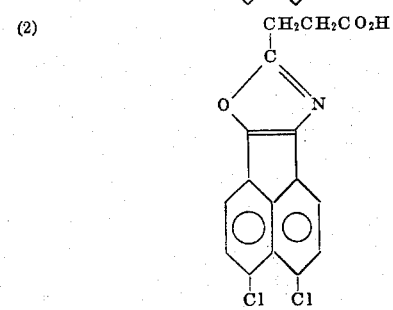

(3)

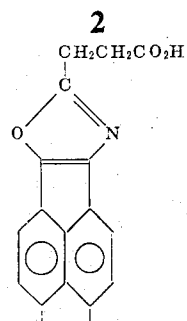

(4)

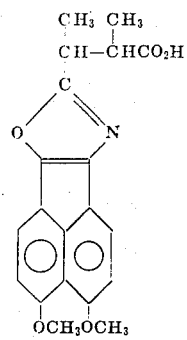

(5)

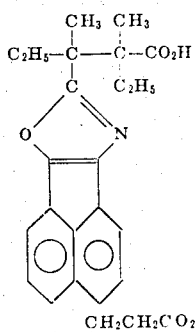

(6)

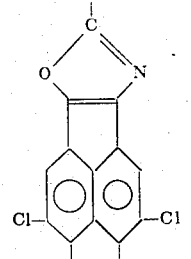

(7)

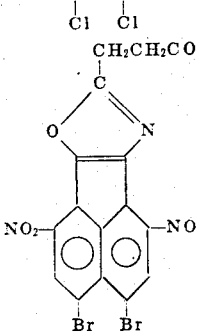

(8)

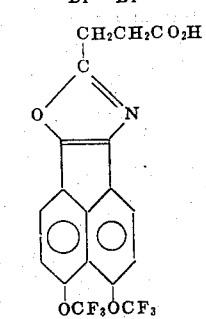

(9) 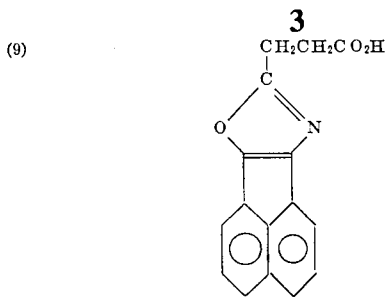
(10) 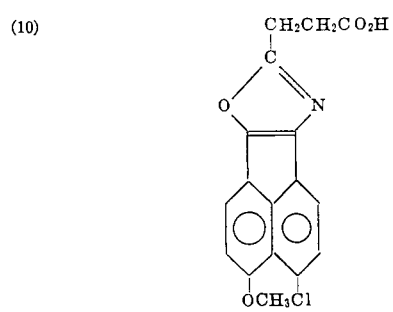
(11) 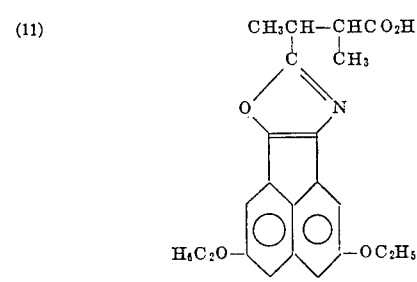
(12) 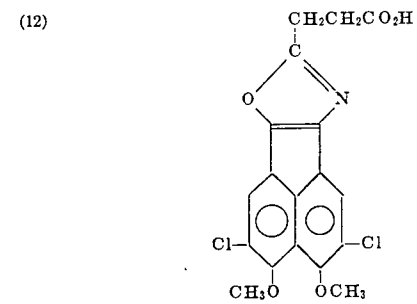
(13) 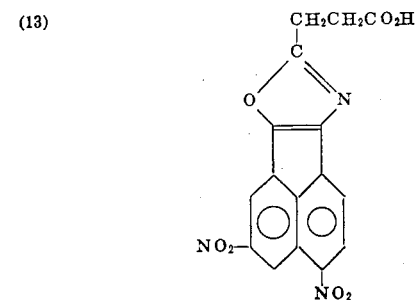
(14) 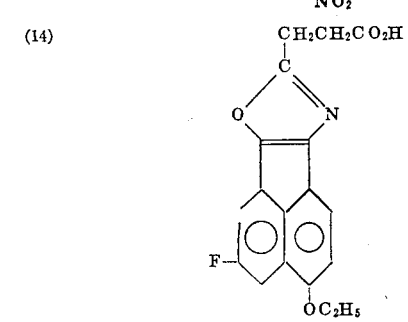
(15) 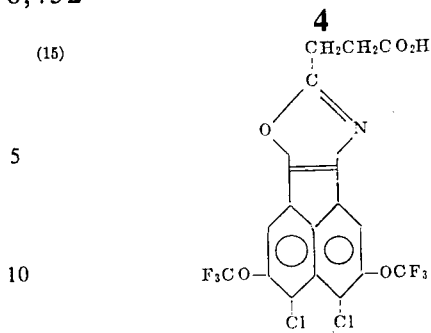
Further in accordance with the present invention, a process is provided for preparing the acenaphthyloxazoles of the invention. The process of the invention is outlined below:
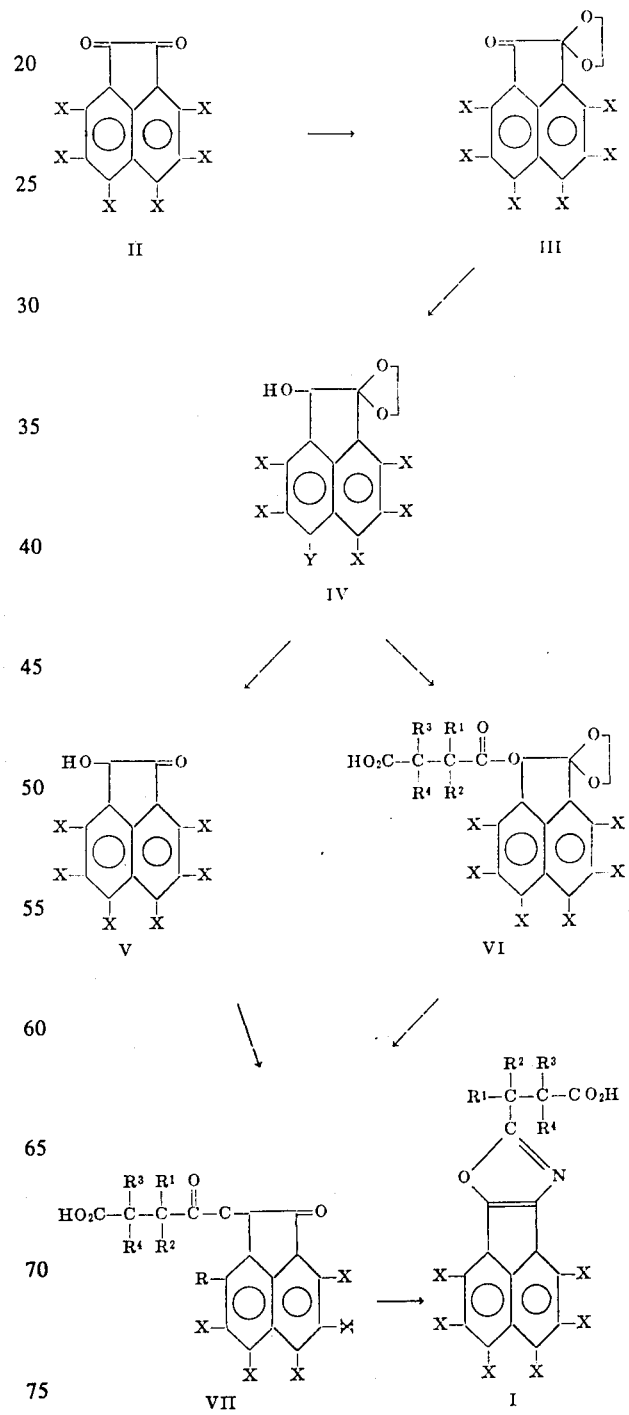

The process of the invention comprises reacting an acenaphthenequinone (II) with ethylene glycol in the presence of an acid catalyst, preferably, p-toluenesulfonic acid, and a solvent, to form an acenaphthenequinone monoethylene ketal (formula III), reducing the acenaphthenequinone monoethylene ketal with a metal hydride to form a 1-hydroxy-2-acenaphthenone monoethylene ketal (formula IV).

The 1-hydroxy-2-acenaphthenone monoethylene ketal (IV) can be hydrolyzed by treatment with an acid catalyst, such as p-toluene-sulfonic acid, in an aqueous acetone medium to form a 1-hydroxy-2-acenaphthenone(V) which is reacted with a succinic acid or acid anhydride in the presence of a base to form a 1-hydroxy-2-acenaphthenone succinate (VII).

Alternatively, the 1-hydroxy-2-acenaphthenone succinate (VII) can be formed by reacting the 1-hydroxy-2-acenaphthenone ethylene ketal (IV) with a succinic acid or acid anhydride in the presence of a base to form a 1-hydroxy-2-acenaphthenone ethylene ketal succinate (VI) and then hydrolyzing the ethylene ketal of the succinate (VI) by treating it with an acid catalyst, for example, p-toluenesulfonic acid, in an aqueous acetone medium to form the 1-hydroxy-2-acenaphthenone succinate (VII).

The 1-hydroxy-2-acenaphthenone succinate (VII), formed by either of the above procedures, can be converted to the acenapht-[1,2-d]oxazole-8-propionic acid (formula I) of the invention by reacting the succinate with ammonium acetate in acetic acid.

The intermediates III, IV, V, VI and VII prepared in forming the acenaphthyloxazoles are novel compounds. These intermediates can be defined by the general formula:

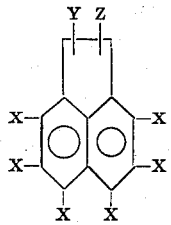

wherein Y and Z are different and Y can be =O, —OH, or

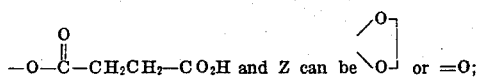

X is as defined hereinbefore.

The starting materials employed in preparing the acenaphthyloxazoles of the invention are acenaphthenequinones of the formula II which may be prepared by the oxidation of an X-substituted acenaphthene. Oxidizing agents, such as chromic acid, calcium permanganate, hydrogen peroxide in acetic acid or sodium dichromate in acetic acid can be employed. When the starting acenaphthenequinone is unsymmetrically substituted, then, in such case, the monoketal product obtained will be a mixture of isomers. Thus, for example, where the acenaphthenequinone includes an X-substituent at one para-position, then two monoketal isomers are possible, namely,

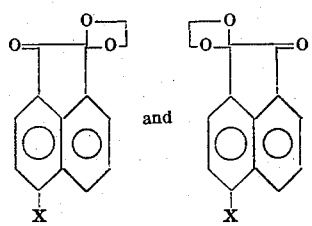

The mixtures of isomers can be separated by thin layer or vapor phase chromatographic techniques.

In preparing the acenaphthenequinone monoethylene ketal (formula III), the acenaphthenequinone is reacted with ethylene glycol in at least equimolar amounts and can be reacted in a mole ratio of acenaphthenequinone:ethylene glycol of up to 1:100 or more. The solvent in the reaction can be an aromatic solvent having a boiling point of 80° C. or higher, such as benzene, toluene or xylene. The reaction to form the monoethylene ketal III is normally carried out at the boiling temperature of the solvent.

Reduction of the acenaphthenequinone monoethylene ketal (III) to the 1-hydroxy-2-acenaphthenone ethylene ketal (IV) is carried out employing a metal hydride reducing agent, such as an alkali metal borohydride, for example, sodium borohydride, potassium borohydride, or lithium borohydride, or lithium aluminum hydride. The solvent employed in the reduction can be an alcohol containing up to about four carbon atoms, such as methyl alcohol, ethyl alcohol, propyl alcohol, isopropyl alcohol, n-butyl alcohol, sec-butyl alcohol, or tert-butyl alcohol or admixtures of the alcohol with water. In addition, dioxane or tetrahydrofuran can be used. The reduction is preferably conducted at room temperature, although temperatures as high as the boiling point of the solvent can be employed.

Hydrolysis of the 1-hydroxy-2-acenaphthenone ethylene ketal (IV) to the 1-hydroxy-2-acenaphthenone (V) is carried out in an aqueous acetone media containing an acid catalyst, such as p-toluene sulfonic acid.

The 1-hydroxy-2-acenaphthenone (V) is converted to the corresponding succinate by reaction with a succinic acid or acid anhydride in the presence of an organic base or an inorganic base, such as pyridine, sodium acetate or potassium acetate. The succinic acid or acid anhydride can include alkyl substituents on the alpha and beta carbon atoms. However, the acid or acid anhydride should be symmetrical with respect to such alkyl substituents so that the substituents on the alpha-carbon correspond to the substituents on the beta-carbon atom. The succinic acid or acid anhydride is reacted with 1-hydroxy-2-acenaphthenone (V) in equimolar quantities. However, large excesses of the succinic acid or anhydride may be employed, for example, excesses of 100 percent or more. The reaction to form the succinate (VII) can be carried out at room temperature, although temperatures as high as 100° C. or more can be employed.

The 1-hydroxy-2-acenaphthenone ethylene ketal can be first reacted with succinic acid or acid anhydride to form the 1-hydroxy-2-acenaphthenone ethylene ketal succinate (VI) and this ketal can be hydrolyzed to form the 1-hydroxy-2-acenaphthenone succinate (VII). The reaction conditions, reactants and mole ratios employed are essentially the same as those described hereinbefore in the ketal hydrolysis and esterification of the 1-hydroxy-2-acenaphthenone ethylene ketal (IV) to the 1-hydroxy-2-acenaphthenone succinate (VII).

The succinate (VII) is then converted to the corresponding acenaphthyloxazole by reaction with ammonium acetate in the presence of acetic acid at temperatures ranging from about 50 to up to about 100° C. The ammonium acetate and succinate (VII) can be employed in equimolar quantities, although excess amounts of the acetate of up to 100 percent or more are usually preferred.

The following examples in the opinion of the inventor represent preferred embodiments of his invention. All temperatures in the examples are expressed in degrees Centigrade:

EXAMPLE 1

Acenaphthenequinone Monoethylene Ketal

A mixture of 1 g. of acenaphthenequinone and 50 mg. of p-toluenesulfonic acid in 5 ml. of ethylene glycol and 50 ml. of benzene is stirred and refluxed overnight. The mixture is cooled and the benzene layer separated. The glycol layer is diluted with water and extracted with benzene. The benzene fractions are combined, washed with 8 percent salt solution, dried (Na₂SO₄) and evaporated to dryness. Plate chromatography of the residue on silica gel using chloroform as the developing solvent gives rise to three bands which are eluted with ethyl acetate. The least polar product is crystallized from chloroform-isopropyl ether to give the title compound: m.p. 93°–94°; λ $^{KBr}$ 5.78μ.

Anal. Calc'd for $C_{14}H_{10}O_3$(226.22): C, 74.33; H, 4.46.
Found: C, 74.14; H, 4.45.

The product of intermediate polarity is crystallized from chloroform-isopropyl ether to give the acenaphtho[1,2-b] bis[1,4]213.5°–214°.

Anal. Calc'd for $C_{16}H_{14}O_4$(270.27): C, 71.10; H, 5.22.
Found: C, 70.85; H, 5.26.

The most polar product is crystallized from chloroform-isopropyl ether to give acenaphthenequinone bis-ethylene ketal m.p. 147.5°–148°.

Anal. Calc'd for $C_{16}H_{14}O_4$(270.27): C, 71.10; H, 5.22.
Found: C, 71.23; H, 5.48.

EXAMPLE 2

1-Hydroxy-2-Acenaphthenone Ethylene Ketal

A solution of 444 mg. of acenaphthenequinone monoethylene ketal in 50 ml. of methanol is treated with 130 mg. of sodium borohydride and stirred at room temperature for 2 hours. The mixture is treated with acetic acid, concentrated and diluted with water. The precipitate is collected by filtration to give the title compound, m.p. 112°–113.5°. Recrystallization from isopropyl ether gives the analytical sample: m.p. 113°–114.5°; λ $^{KBr}$ 2.94μ.

Anal. Calc'd for $C_{14}H_{12}O_3$(228.24): C, 73.67; H, 5.30.
Found: C, 73.45; H, 5.17.

EXAMPLE 3

1-Hydroxy-2-Acenaphthenone

A mixture of 143 mg. of 1-hydroxy-2-acenaphthenone ethylene ketal and 15 mg. of p-toluenesulfonic acid in 1 ml. of water and 20 ml. of acetone is refluxed overnight. The mixture is concentrated, diluted with water and extracted with chloroform. The chloroform extracts are washed with 8 percent salt solution, dried (Na₂SO₄) and evaporated to give the title compound.

EXAMPLE 4

1-Hydroxy-2-Acenaphthenone Ethylene Ketal Succinate

A mixture of 2 g. of 1-hydroxy-2-acenaphthenone ethylene ketal and 2 g. of succinic anhydride in 10 ml. of pyridine is stirred at room temperature for 3 days. The mixture is diluted with water and extracted with chloroform. The chloroform extracts are washed with 8 percent salt solution, dried (Na₂SO₄) and evaporated to dryness. The residue is crystallized from acetone-hexane-ether to give 2.53 g. of the title compound, m.p. 110°–112°. Recrystallization from acetone-hexane-ether gives the analytical sample: m.p. 110°–111.5°; λ $^{KBr}$ 5.75 and 5.86μ.

Anal. Calc'd for $C_{18}H_{16}O_6$(328.33): C, 65.85; H, 4.91.
Found: C, 65.73; H, 4.85.

EXAMPLE 5

1-Hydroxy-2-Acenaphthenone Succinate

A. Following the procedure of Example 4 but substituting 1-hydroxy-2-acenaphthenone for 1-hydroxy-2-acenaphthenone ethylene ketal, there is obtained the title compound: τ$^{TMS}_{CDCl_3}$ 7.20 (S,—(CH₂)₂—) and 3.65 (S, 1-H).

B. Following the procedure of Example 3 but substituting 1-hydroxy-2-acenaphthenone ethylene ketal succinate for 1-hydroxy-2-acenaphthenone ethylene ketal, there is obtained the title compound.

EXAMPLE 6

Acenaphth[1,2-d]oxazole-8-Propionic Acid

A mixture of 1 g. of 1-hydroxy-2-acenaphthenone-succinate and 2 g. of ammonium acetate in 20 ml. of acetic acid is warmed at 50° for 1 hour. The mixture is cooled, diluted with water and extracted with chloroform. The chloroform extracts are washed with 8 percent salt solution, dried (Na₂SO₄) and evaporated to give the title compound.

What is claimed is:

1. An acenaphthyloxazole of the general formula

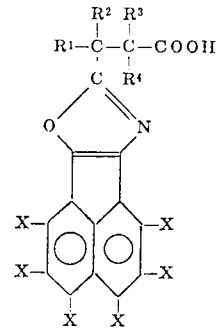

wherein the X's can be the same or different and are selected from the group consisting of hydrogen, halogen, nitro, lower alkoxy having from one to four carbon atoms or halo-lower alkoxy having from one to four carbon atoms, and $R^1$, $R^2$, $R^3$ and $R^4$ can be the same or different and are hydrogen or lower alkyl having from one to four carbon atoms.

2. An acenaphthyloxazole in accordance with claim 1 wherein the pair of $R^1$ and $R^2$ substituents correspond to the pair of $R^3$ and $R^4$ substituents.

3. An acenaphthyloxazole in accordance with claim 1 wherein the X's at each of the para positions of the acenaphthene ring are other than hydrogen.

4. An acenaphthyloxazole in accordance with claim 1 having the structure:

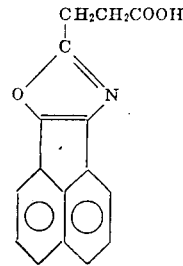

5. A process for preparing acenaphthyloxazole derivatives of claim 1, which comprises reacting an appropriately substituted acenaphthenequinone with ethylene glycol in the presence of p-toluenesulfonic acid to form an acenaphthenequinone monoethylene ketal, reducing the monoethylene ketal with a metal hydride to form a 1-hydroxy-2-acenaphthenone ethylene ketal, converting the 1-hydroxy-2-acenaphthenone ethylene ketal to a 1-hydroxy-2-acenaphthenone succinate by subjecting the ketal to (a) hydrolysis in the presence of p-toluenesulfonic acid, and (b) reaction with a succinic acid or acid anhydride in the presence of a base, (a) and (b) being taken in either order, and reacting 1-hydroxy-2-acenaphthenone succinate with ammonium acetate in acetic acid to form an acenapht[1,2-d]-oxazole-8-propionic acid.

6. A process in accordance with claim 5 which comprises hydrolyzing the 1-hydroxy-2-acenaphthenone ethylene ketal by treating it in an aqueous acetone medium in the presence of p-toluenesulfonic acid to form a 1-hydroxy-2-acenaphthenone and reacting the 1-hydroxy-2-acenaphthenone with a succinic acid or acid anhydride in the presence of a base selected from the group consisting of pyridine, sodium acetate and potassium acetate to form the 1-hydroxy-2-acenaphthenone succinate starting material.

7. A process in accordance with claim 5 which comprises reacting the 1-hydroxy-2-acenaphthenone ethylene ketal with a succinic acid or acid anhydride in the presence of a base selected from the group consisting of pyridine, sodium acetate and potassium acetate to form a 1-hydroxy-2-acenaphthenone ethylene ketal succinate and treating the 1-hydroxy-2-acenaphthenone ethylene ketal succinate in an aqueous acetone medium with p-toluenesulfonic acid to form the 1-hydroxy-2-acenaphthenone succinate starting material.

* * * * *

UNITED STATES PATENT OFFICE
CERTIFICATE OF CORRECTION

Patent No. 3,676,452                    Dated July 11, 1972

Inventor(s) Seymour D. Levine

It is certified that error appears in the above-identified patent and that said Letters Patent are hereby corrected as shown below:

In the Abstract, please insert the following as the first paragraph after the title "ABSTRACT":

Acenaphthyloxazoles are provided having the general structure:

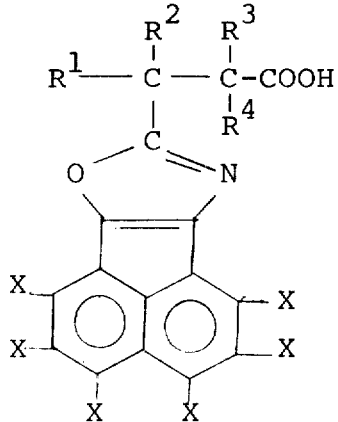

wherein $R^1$, $R^2$, $R^3$, $R^4$ can be hydrogen or lower alkyl and X is hydrogen, halogen, nitro, alkoxy or haloalkoxy. These compounds possess anti-inflammatory activity.

UNITED STATES PATENT OFFICE
CERTIFICATE OF CORRECTION

Patent No. 3,676,452  Dated July 11, 1972

Inventor(s) Seymour D. Levine

It is certified that error appears in the above-identified patent and that said Letters Patent are hereby corrected as shown below:

Column 4, formula IV:

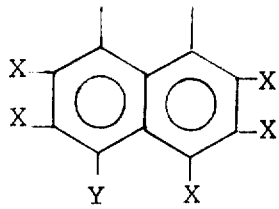  should read:  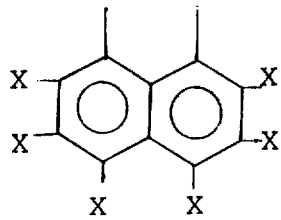

Column 4, formula VII:

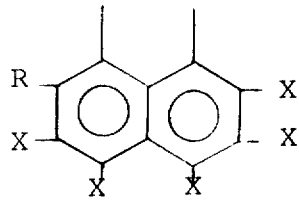  should read:  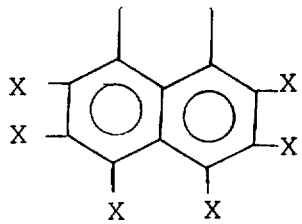

Column 7, line 15, insert -- dioxane, m.p. -- after: "bis[1,4]".

Signed and sealed this 20th day of February 1973.

(SEAL)
Attest:

EDWARD M. FLETCHER, JR.
Attesting Officer

ROBERT GOTTSCHALK
Commissioner of Patents